United States Patent
Hymel

(10) Patent No.: US 8,676,579 B2
(45) Date of Patent: Mar. 18, 2014

(54) DUAL MICROPHONE VOICE AUTHENTICATION FOR MOBILE DEVICE

(75) Inventor: James Allen Hymel, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/459,765

(22) Filed: Apr. 30, 2012

(65) Prior Publication Data

US 2013/0289999 A1 Oct. 31, 2013

(30) Foreign Application Priority Data

Apr. 30, 2012 (EP) .................................... 12166146

(51) Int. Cl.
- G10L 15/26 (2006.01)
- G10L 15/06 (2013.01)
- G10L 17/00 (2013.01)
- G10L 15/04 (2013.01)
- G10L 21/00 (2013.01)

(52) U.S. Cl.
USPC ........... 704/235; 704/243; 704/246; 704/247; 704/251; 704/252; 704/270; 704/270.1; 704/275

(58) Field of Classification Search
USPC ......... 704/235, 243, 246, 247, 251, 252, 270, 704/270.1, 275
See application file for complete search history.

(56) References Cited

U.S. PATENT DOCUMENTS

| | | | |
|---|---|---|---|
| 5,737,431 A * | 4/1998 | Brandstein et al. | 381/92 |
| 6,009,396 A * | 12/1999 | Nagata | 704/270 |
| 6,288,641 B1 * | 9/2001 | Casais | 340/539.26 |
| 6,731,334 B1 | 5/2004 | Maeng et al. | |
| 6,868,045 B1 * | 3/2005 | Schroder | 367/198 |
| 7,158,776 B1 * | 1/2007 | Estes et al. | 455/411 |
| 7,453,400 B2 * | 11/2008 | Struckman et al. | 342/465 |
| 7,822,213 B2 * | 10/2010 | Choi et al. | 381/92 |
| 7,885,818 B2 * | 2/2011 | Vignoli | 704/275 |
| 7,995,090 B2 * | 8/2011 | Liu et al. | 348/14.01 |
| 8,214,219 B2 * | 7/2012 | Prieto et al. | 704/275 |
| 8,237,770 B2 * | 8/2012 | Kenoyer et al. | 348/14.08 |
| 8,243,902 B2 * | 8/2012 | Caspi et al. | 379/202.01 |
| 2002/0181723 A1 * | 12/2002 | Kataoka | 381/92 |
| 2003/0033150 A1 * | 2/2003 | Balan et al. | 704/275 |

(Continued)

FOREIGN PATENT DOCUMENTS

| | | |
|---|---|---|
| EP | 1669836 A1 | 6/2006 |
| EP | 2028062 A2 | 2/2009 |

OTHER PUBLICATIONS

Stokes, J.W.; Platt, John C.; Basu, S., "Speaker Identification using a Microphone Array and a Joint HMM with Speech Spectrum and Angle of Arrival," Multimedia and Expo, 2006 IEEE International Conference on , vol., No., pp. 1381,1384, Jul. 9-12, 2006.

(Continued)

Primary Examiner — Edgar Guerra-Erazo
(74) Attorney, Agent, or Firm — Gowling Lafleur Henderson LLP

(57) ABSTRACT

A method of authenticating a user of a mobile device having a first microphone and a second microphone, the method comprising receiving voice input from the user at the first and second microphones, determining a position of the user relative to the mobile device based on the voice input received by the first and second microphones, and authenticating the user based on the position of the user.

18 Claims, 11 Drawing Sheets

(56) References Cited

U.S. PATENT DOCUMENTS

| | | | |
|---|---|---|---|
| 2004/0042626 A1* | 3/2004 | Balan et al. | 381/110 |
| 2007/0038444 A1* | 2/2007 | Buck et al. | 704/235 |
| 2008/0071537 A1* | 3/2008 | Tamir et al. | 704/246 |
| 2008/0154613 A1* | 6/2008 | Haulick et al. | 704/275 |
| 2008/0252412 A1* | 10/2008 | Larsson et al. | 340/5.2 |
| 2008/0273714 A1* | 11/2008 | Hartung | 381/86 |
| 2009/0055178 A1* | 2/2009 | Coon | 704/246 |
| 2009/0055180 A1* | 2/2009 | Coon et al. | 704/251 |
| 2009/0088215 A1 | 4/2009 | Caspi et al. | |
| 2009/0110225 A1* | 4/2009 | Kim | 381/356 |
| 2010/0016052 A1* | 1/2010 | Gagner et al. | 463/16 |
| 2010/0020951 A1 | 1/2010 | Basart | |
| 2010/0225471 A1* | 9/2010 | Kawamoto et al. | 340/539.13 |
| 2011/0054891 A1* | 3/2011 | Vitte et al. | 704/233 |
| 2011/0148710 A1* | 6/2011 | Smid et al. | 342/394 |
| 2012/0062357 A1* | 3/2012 | Slamka | 340/4.11 |

OTHER PUBLICATIONS

Jack W Stokes, Microsoft Research, "Speaker Identification Using a Microphone Array and a Joint HMM With Speech Spectrum and Angle of Arrival".

Gang Mei, "Real-Time Speaker Verification With a Microphone Array", 2006.

2007 Sensory Inc—SoundSource™ Technology.

Xiaojie Chen et al—"Speaker Tracking and Identifying Based on Indoor Localiaztion System and Microphone Array" May 21, 2007.

European Search Report dated Oct. 17, 2012 from corresponding EP application 12166146.6.

* cited by examiner

US 8,676,579 B2

DUAL MICROPHONE VOICE AUTHENTICATION FOR MOBILE DEVICE

CROSS-REFERENCE TO RELATED APPLICATIONS

This application claims the benefit of foreign priority from European Patent Application Serial Number 12166146.6 filed Apr. 30, 2012.

TECHNICAL FIELD

The present technology relates generally to mobile devices and, in particular, to voice authentication techniques for mobile devices.

BACKGROUND

Various user authentication technologies are known for restricting access to a mobile device. These may include, for example, passwords, facial recognition, and voice authentication.

For voice authentication, the user speaks a word or phrase. The device analyzes the frequency content of the voice signal to generate a voice print. The device compares this voice print against a pre-recorded voice print to assess whether the speaker is the authorized user of the device.

One security weakness of this voice authentication technology is that an unauthorized person may gain access to the device by playing a recording of the user's voice. One improvement of the voice authentication technique is to require the user to speak a password or passphrase which the user keeps secret. This makes it more difficult, but not impossible, for unauthorized users to gain access to the device. Accordingly, further security enhancements for voice authentication remain highly desirable. One such improvement is disclosed in this specification.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

The present technology provides a voice authentication technique that authenticates the user based on the position of the user relative to the mobile device. The position of the user relative to the mobile device is determined using first and second microphones on the mobile device.

Accordingly, one aspect of the present technology is a method of authenticating a user of a mobile device having a first microphone and a second microphone. The method entails receiving voice input from the user at the first and second microphones, determining a position of the user relative to the mobile device based on the voice input received by the first and second microphones, and authenticating the user based on the position of the user.

Another aspect of the present technology is a computer-readable medium comprising instructions in code which when loaded into a memory and executed by a processor of a mobile device cause the mobile device to receive voice input from the user at the first and second microphones, determine a position of the user relative to the mobile device based on the voice input received by the first and second microphones, and authenticate the user based on the position off the user.

Another aspect of the present technology is a mobile device comprising first and second microphones for receiving voice input from a user of the mobile device and a processor operatively coupled to a memory for determining a position of the user relative to the mobile device based on the voice input received at the first and second microphones and for authenticating the user based on the position of the user.

The details and particulars of these aspects of the technology will now be described below, by way of example, with reference to the drawings.

In general, the present technology enables a mobile device such as a touch-screen tablet to authenticate a user based on the position of the user relative to the mobile device. The position of the user relative to the mobile device is determined based on voice input received by two spaced-apart microphones on the mobile device. For the purposes of this specification, the "position" or "angle" of the speaker (or user) shall refer to the relative position of the device and the user when the user speaks a password or otherwise provides voice input to the device.

Figure 1:
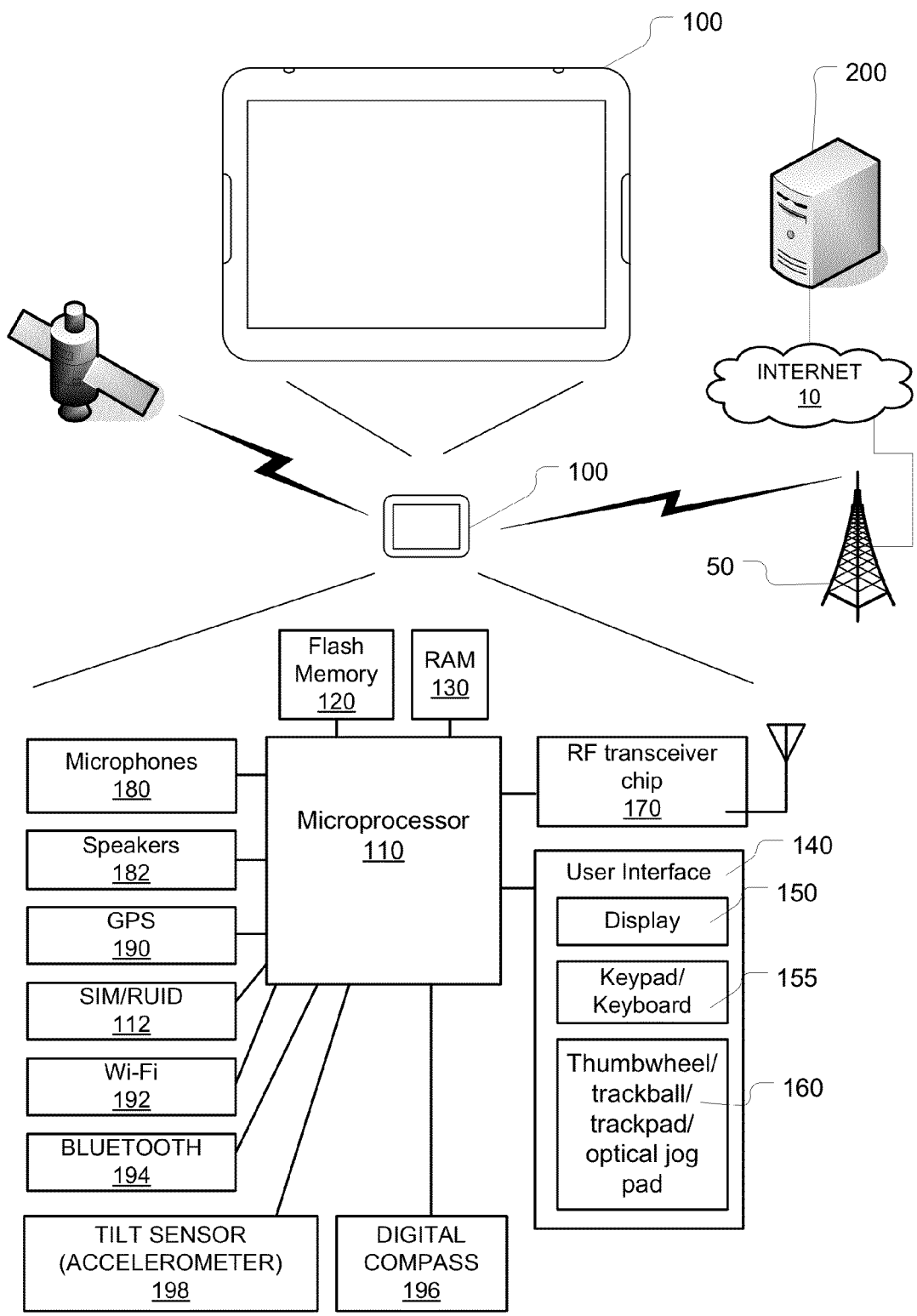
FIG. 1 is a depiction of a touch-screen computing tablet having dual microphones as one example of a mobile device on which the present technology may be implemented, the depiction including a schematic depiction of some main components of the device.

FIG. 1 is a depiction of a touch-screen tablet as one example of a mobile device (or simply "device"), which is generally designated by reference numeral 100, that uses two onboard microphones 180 to authenticate a user based on the user's position relative to the device 100 when the user provides voice input to the device's authentication system. This tablet may be a touch-screen computing tablet having at least two spaced-apart microphones as illustrated by way of example or any other portable computing device having two or more microphones such as, for example, cell phones, smart phones, satellite phones, personal digital assistants (PDA's), laptops, palmtops, notebooks, handheld electronic gaming devices, or any other portable or handheld electronic devices that include two or more microphones.

The device 100 includes a processor (or microprocessor) 110 and memory 120, 130 for executing one or more applications such as a voice authentication application or a speech recognition application.

As depicted by way of example in FIG. 1, the memory may include flash memory 120 and/or random access memory (RAM) 130 for storing one or more applications for voice-based authentication. The memory may also store data including a voice print of the registered (authorized) user of the device. Other types or forms of memory may be substituted or used.

As depicted by way of example in FIG. 1, the device 100 includes a user interface 140 for interacting with the mobile device and any applications running on the device, such as, for example, the voice authentication application. The user interface 140 may include one or more input/output devices, such as a display screen 150 (e.g. an LCD or LED screen or touch-sensitive display screen), and a keyboard or keypad 155. The user interface may also include an optical jog pad 160 and/or a thumbwheel, trackball, track pad or equivalent.

As depicted by way of example in FIG. 1, the device 100 may optionally include a transceiver 170 for communicating with other devices. The transceiver 170 may be a radiofrequency (RF) transceiver for wirelessly communicating with one or more base stations over a cellular wireless network using cellular communication protocols and standards for both voice calls and packetized data transfer such as GSM, CDMA, GPRS, EDGE, UMTS, LTE, etc. The present technology may be used on a device that does not have a transceiver.

The mobile device 100 may optionally include a Subscriber Identity Module (SIM) card 112 for GSM-type devices or a Re-Usable Identification Module (RUIM) card for CDMA-type devices. The RF transceiver 170 may include separate voice and data channels.

The mobile device 100 optionally includes a speech-recognition subsystem for transforming voice input received by the dual microphones 180 in the form of sound waves into electrical signals and then converting the analog signals into digital signals that constitute voice input data. This voice input data is then processed by a speech-recognition module (digital signal processor) to determine keywords or phrases from the voice input.

Optionally, the mobile device 100 may include one or more speakers 182 and/or one or more earphone jacks.

The device may optionally include a positioning subsystem (position-determining subsystem) such as a Global Positioning System (GPS) receiver 190 or any other global navigation satellite system (GNSS). Other position-determining subsystems may be include a WPS (Wi-Fi Positioning System), a radiolocation subsystem that determines its current location using radiolocation techniques using triangulation of signals from in-range base towers, such as used for Wireless E911. Other location-determining subsystems may involve, for example, techniques based on the identity of the closest base station tower or techniques involving obtaining information stored in a home location register (HLR) or visitor location register (VLR).

Optionally, the mobile device 100 may include a Wi-Fi™ transceiver 192, a Bluetooth® transceiver 194, and/or a near-field communications (NFC) chip. The mobile device 100 may also optionally include a transceiver for WiMax™ (IEEE 802.16), a transceiver for ZigBee® (IEEE 802.15.4-2003 or other wireless personal area networks), an infrared transceiver or an ultra-wideband transceiver.

Optionally, the mobile device may include other sensors like a digital compass 196 and/or a tilt sensor or accelerometer 198.

Figure 2:
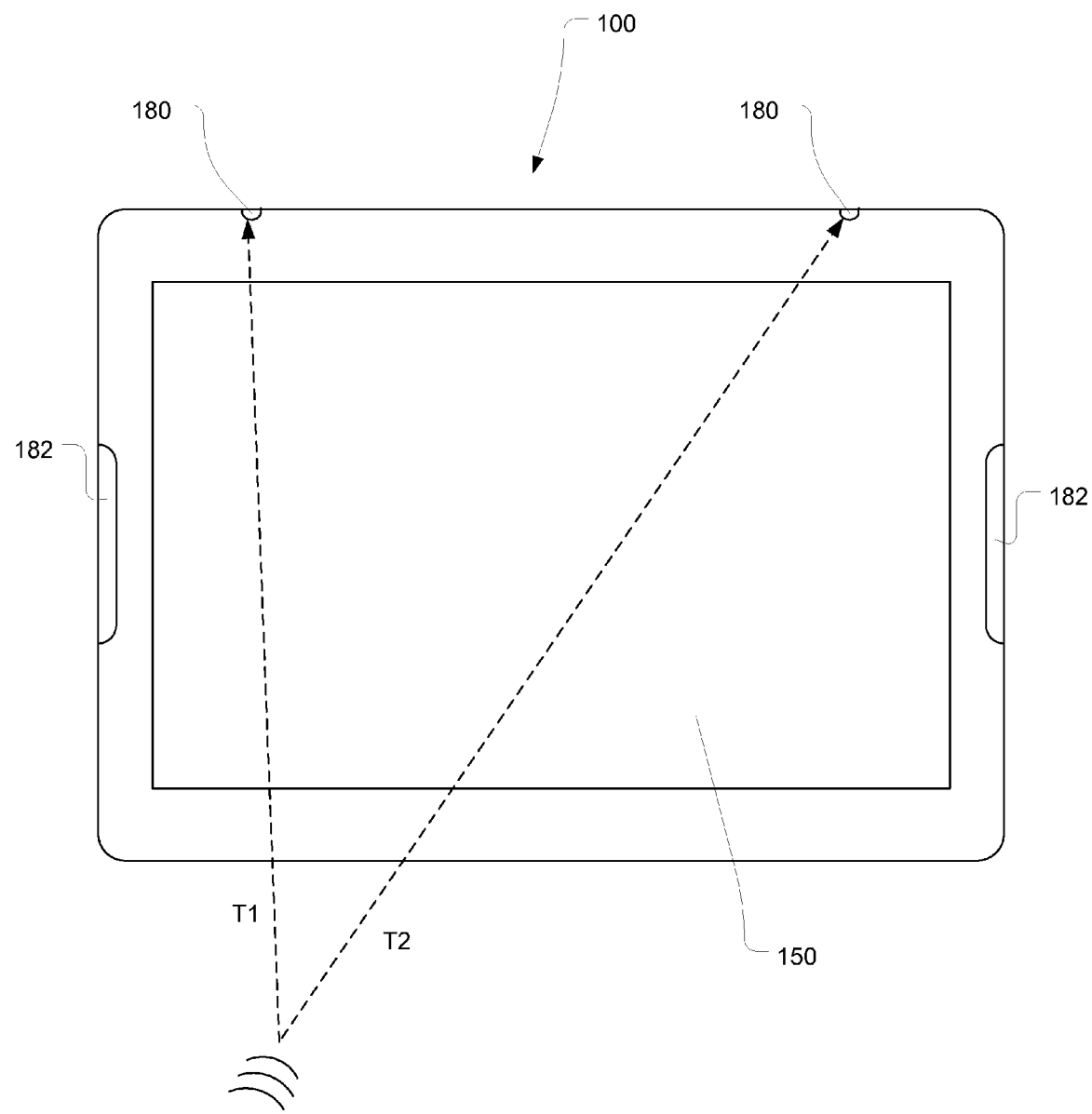
FIG. 2 depicts an example of a tablet having two spaced-apart microphones for receiving voice input from which the position of the user relative to the device is determined.

A tablet having dual (stereo) microphones 180 is presented by way of example in FIG. 2. This tablet includes a touch-sensitive display 150 for providing a graphical user interface and for receiving touch input. A pair of stereo speakers 182 may be provided as shown in FIG. 2. The microphones and speakers may be located in any other suitable location on the device. In another implementation, the device may have three or more microphones. The plurality of microphones may be identical or, in a variant, the microphones may be different.

As depicted by way of example in FIG. 2, the first and second microphones 180 detect a voice signal emanating from the speaker (user). Based on the time difference of arrival (TDOA), the distance between the microphones and the speed of sound, the processor computes the position (i.e. angle) of the user when the sound waves of the voice input left the speaker's mouth. The device may be configured to filter out all ambient background noise and then to process the voice input data received at the first and second microphones 180 to determine (based on the time difference of arrival) the angle or position from which the voice input was provided. The authentication process may also involve the comparison of the voice input data with a pre-recorded voice print of the authorized user.

To implement this novel voice authentication technology, the processor 110 is operatively coupled to the memory 120, 130 of the device to receive voice data signals from the first and second microphones 180 from which the processor (or a voice authentication application being executed by the processor) determines a position of the user when the voice input was provided. The processor (or the voice authentication application) determines if the position corresponds to an authentication zone. If the position does correspond to the authentication zone, the user is authenticated. If the position does not correspond to the authentication zone, the authentication fails. Optionally, the device indicates to the user that the authentication has failed. In one specific implementation, the device displays a message to the user that the authentication has failed because the location or position of the user relative to the device when the voice input was provided was incorrect or did not correspond to the authentication zone.

Operation of this novel technology will now be described with reference to the examples depicted in FIGS. 3-6. These examples illustrate how a user may set an authentication zone, how the user can then be authenticated using two spaced-apart microphones (i.e. stereo microphones or a microphone array) to determine the position of the user relative to the device and also what transpires when authentication fails and has to be retried.

Figure 3:
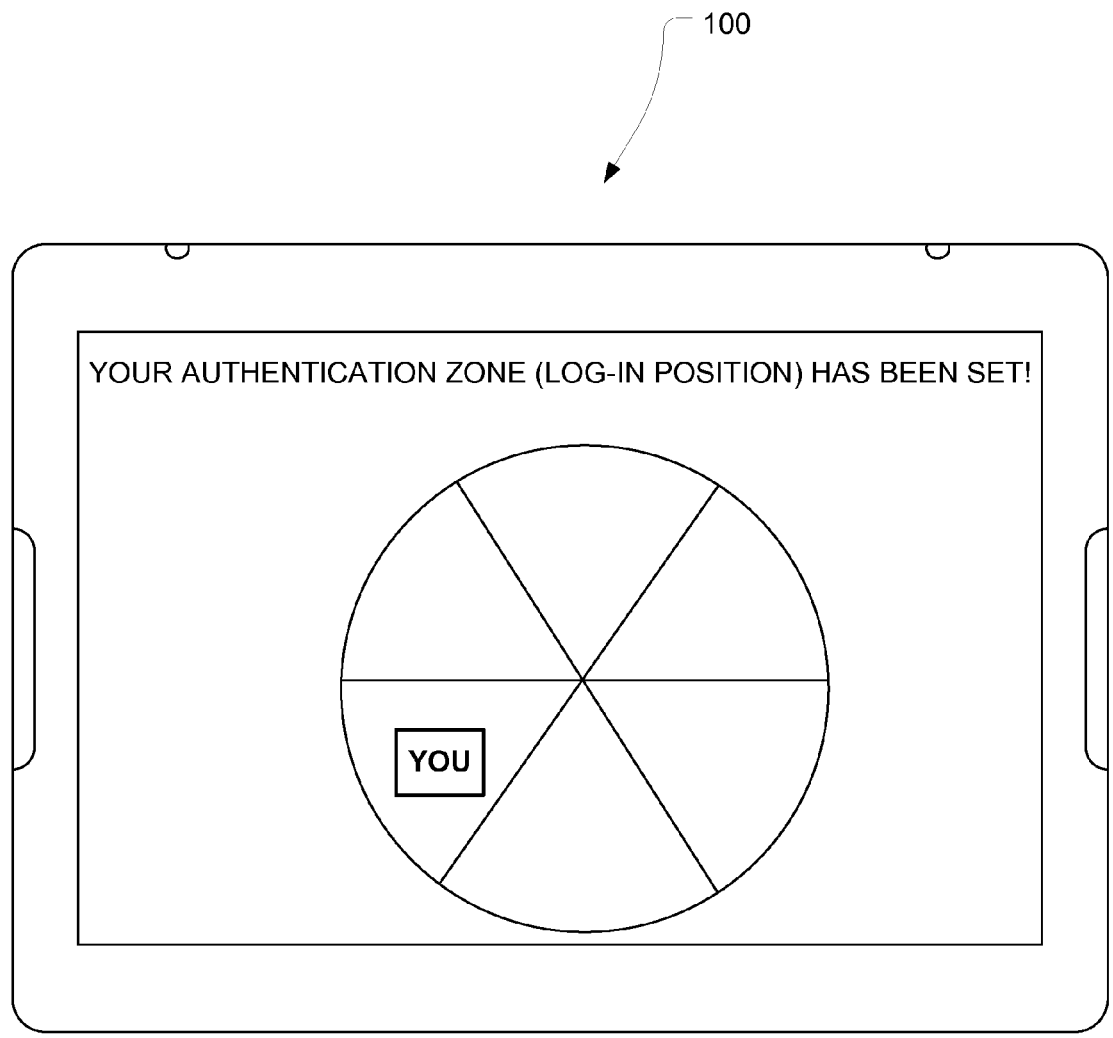
FIG. 3 depicts an example of a tablet displaying a confirmation to the user that an authentication zone has been set.

As shown by way of example in FIG. 3, the user creates an authentication zone either manually or automatically. In the former case, the user interacts with the tablet 100 to select an authentication zone. This may be done by providing user input via the user interface to request that the device display possible predetermined authentication zones. In the example of FIG. 3, the authentication zones are presented as angular sectors surrounding the device. Other geometries or arrangements may be employed, such as for example, quadrants. The user manually selects an authentication zone, for example by touching the authentication zone or by typing a number, letter or code corresponding to the desired authentication zone. As will be appreciated, the geometry, size and shape of the authentication zones may be user-reconfigurable. This would enable the user to select broad zones or narrow zones or to change the type of authentication zone (e.g. from angular sectors to quadrants or vice versa).

Figure 7:
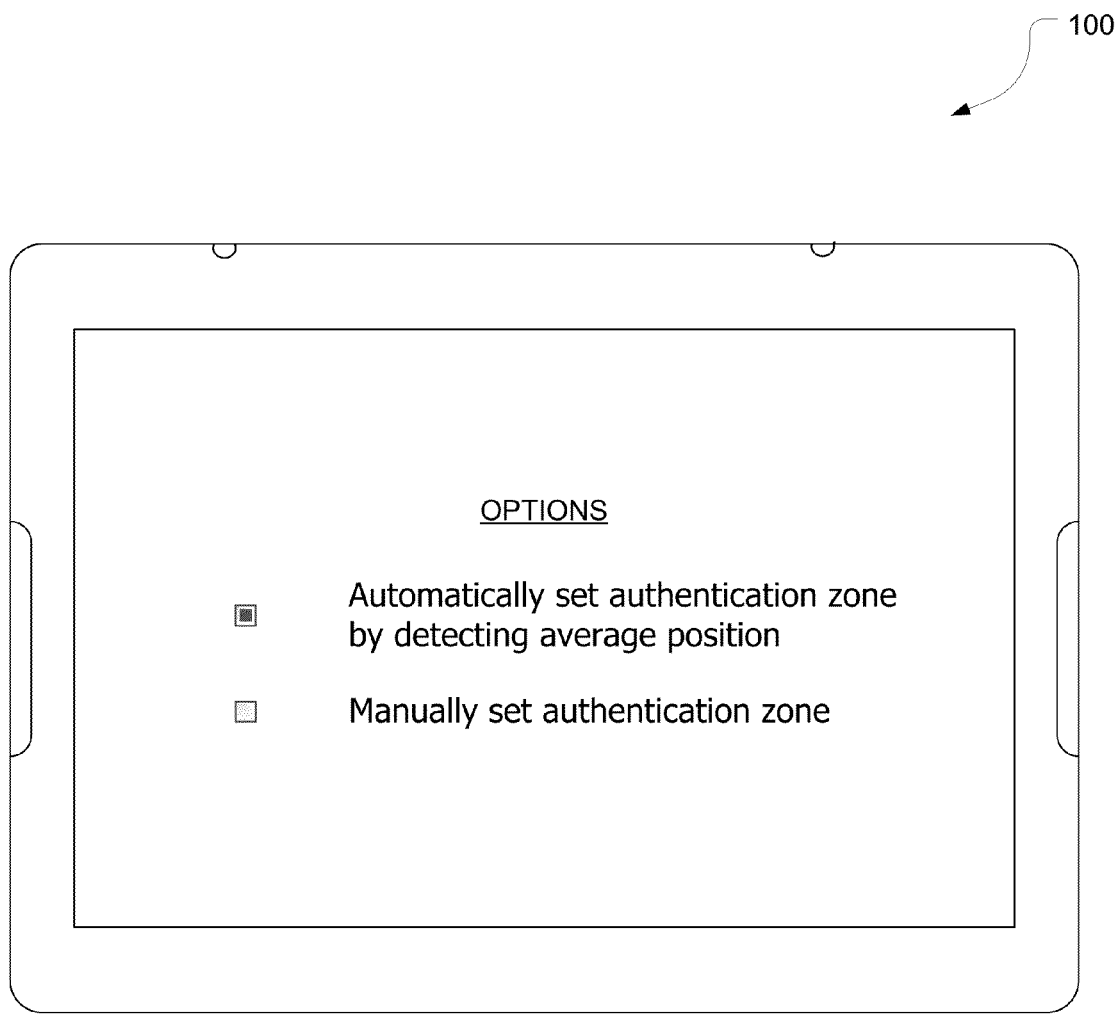
FIG. 7 depicts an options page enabling selection of manual or automatic zone determination.

Automatic creation of authentication zones is also possible, and will be described in greater detail below with regard to FIG. 7.

Once the authentication zone has been defined, the device is ready for position-based voice authentication. Position-based voice authentication may be disabled or enabled by the user. The position-based voice authentication may be automatically enabled based on certain predetermined conditions such as based on location and/or time. With position-based voice authentication, the device only grants access if the user provides voice input from the correct angle (i.e. in the correct position relative to the device).

Figure 4:
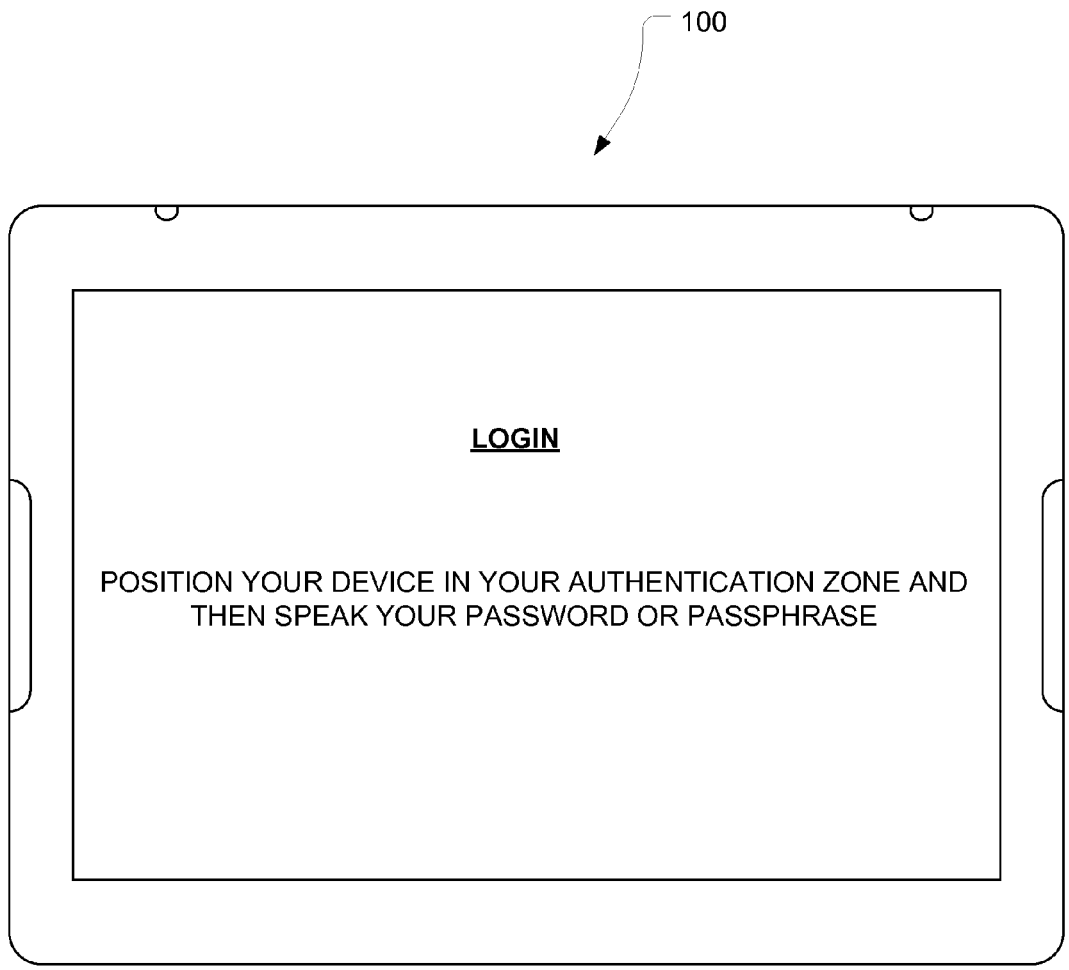
FIG. 4 depicts an example of a tablet displaying instructions to the user for performing voice-based login.

As shown by way of example in FIG. 4, the device may optionally provide instructions to the user to provide voice input in the authentication zone. In lieu of textual instructions, the device may provide another form of signal, e.g. a LED might light up or blink, an audible sound may be played, or a symbol or icon displaced on the main login screen. In another implementation, these login instructions may be absent, requiring the user to know implicitly that the device is expecting this form of input. In response to voice input, the device then performs its analysis of the angle of the voice providing the voice input. This is referred to herein either as position-dependent voice authentication or as angle-based voice authentication. If the user speaks the correct password or passphrase with the device angled or positioned correctly such that this angle or position corresponds with the authentication zone, the device grants access. In other words, the device will grant access if the angle of the voice lies within a prescribed angular range, i.e. if the position of the user relative to the device lies within the authentication zone.

Figure 5:
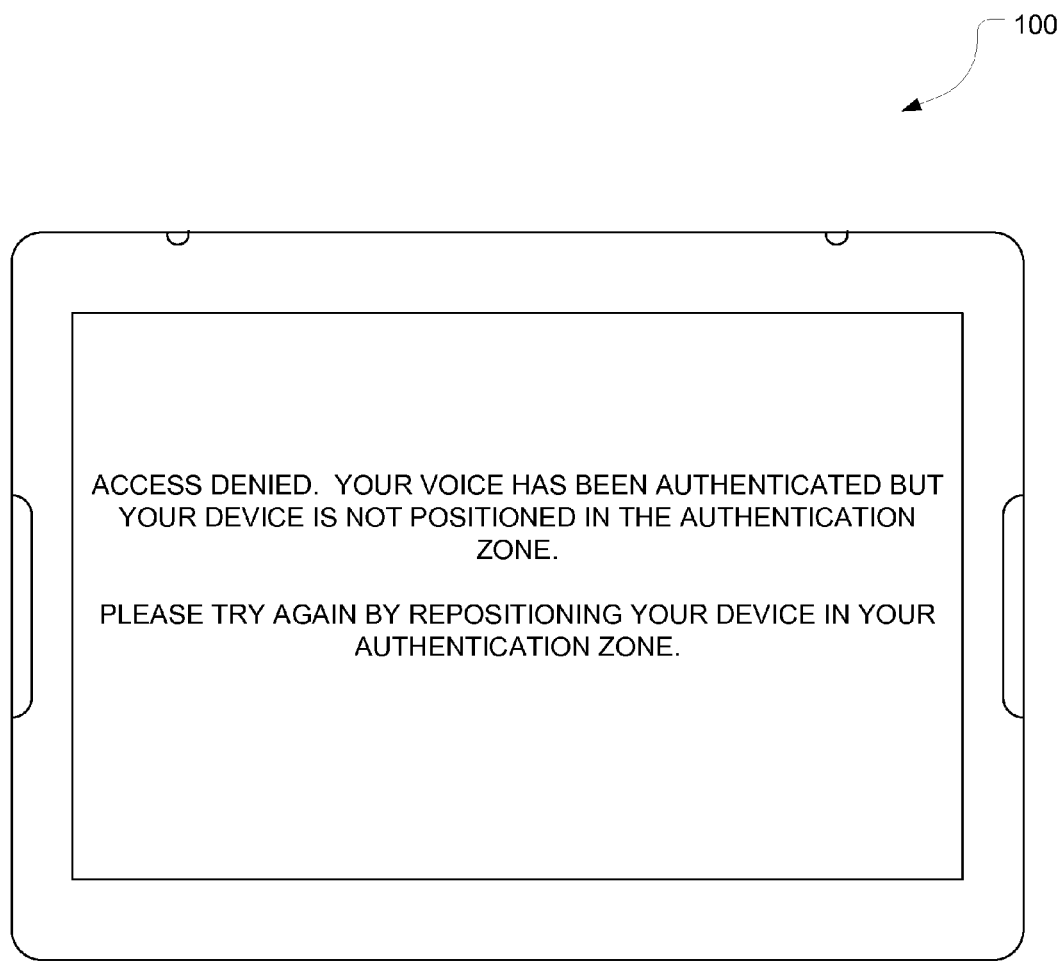
FIG. 5 depicts an example of a tablet presenting an indication that access has been denied and requesting that the user provide new voice input in a different relative position.

FIG. 5 depicts an example in which access is denied by the device. In this example, the voice input is identified as belonging to the authorized user of the device (by matching voice prints) but the user was not in the correct position relative to the device when the voice input was provided. This illustrates how this novel technology provides a second layer of authentication to require not only voice identification and optionally also password matching but also further authentication contingent on the user being in the right position relative to the device. For example, the device may require that the voice input be provided at an angle of 30-40 degrees to the left, or 90 degrees from the right, etc. Angles may be expressed in terms of an angular range (e.g. 20-35 degrees) or an angle with an angular tolerance (i.e. 45 degrees+/−5 degrees).

In one implementation, the device may require multiple voice inputs from sequentially different positions to provide even greater security. For example, the user may be required to provide first voice input from a first position and then second voice input from a second position. As will be appreciated, this may be extrapolated to a sequence of three or more voice inputs for an even more complex (and more secure) login and authentication process.

In a variant, the first voice input may require a different password or passphrase than the second password or passphrase. In other words, in this variant, the device requires that the user provide first voice input by speaking a first password at a first position relative to the device. If this input is authenticated, then the device requires that the user provide second voice input by speaking a second password or passphrase (that is different from the first password or passphrase) at a second position (that is different from the first position). If this second input is authenticated, then the device grants access to the user.

Figure 6:
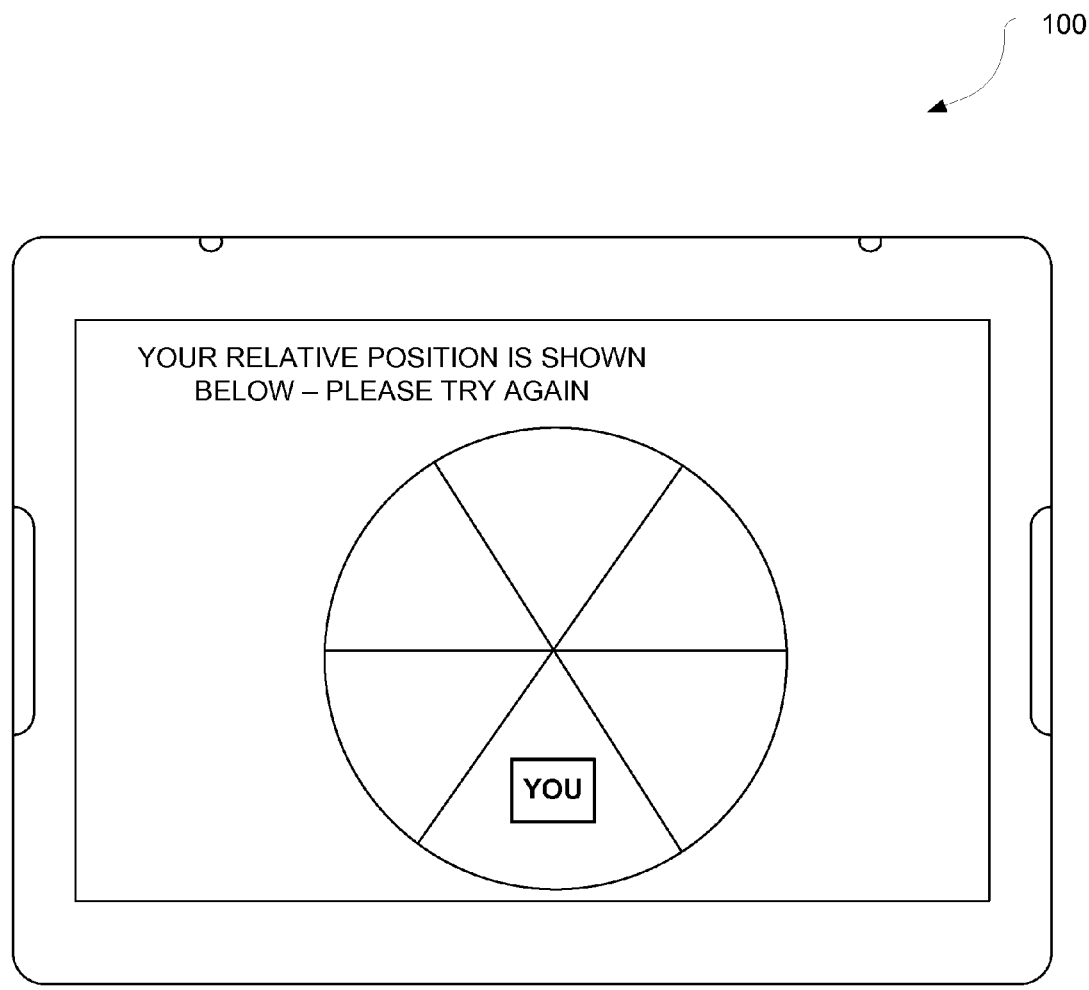
FIG. 6 depicts an example of a tablet presenting an indication of the user's relative position to the tablet when the attempted login failed.

FIG. 6 depicts an example in which the tablet provides visual feedback to the user whose authentication has failed. In this example, the tablet may indicate visually the login position or authentication zone corresponding to the user's failed input. This informs the user that the input was not provided from the right place and furthermore indicates the zone from which the input was provided. This enables the user to adjust or refine his or her relative position by moving to a new position (or by moving the device relative to the user). For the purposes of this specification, it is to be understood that references to a position mean the relative position, and that a new position of the user can be provided by moving the device relative to the user which is generally easier than physically moving relative to a stationary device. In a variant, the device may display the attempted login position in other ways. For example, the device may display a generally circular flower with a number of petals representing angular sectors. The flower petal that corresponds to the attempted login position may be coloured, highlighted, shaded or otherwise visually emphasized to show the user where he provided his input. This flower representation is a more user-friendly way of representing the angular sectors to the user to thereby guide the user when providing new input. In a variant, the user may select from a list of preset graphical representations that might include, for example, a simple circle divided into angular sectors, a flower with petals, a wheel with spokes, a pie with pie slices, etc.

Automatic setting of the authentication zone is another way of defining the authentication zone within which voice input will be considered to be valid. FIG. 7 depicts an example of an options page (which may be in the form of a settings and configurations screen, window, dialog, etc.) The user may thereby configure the device to either accept manual setting of the authentication zone or to perform an automatic setting of the authentication zone. Unlike the manual approach, which was described earlier, the automatic setting of the authentication zone may be done by collecting voice inputs over a predetermined period of time in order to determine usage patterns from which the authentication zone may be computed.

Figure 8:
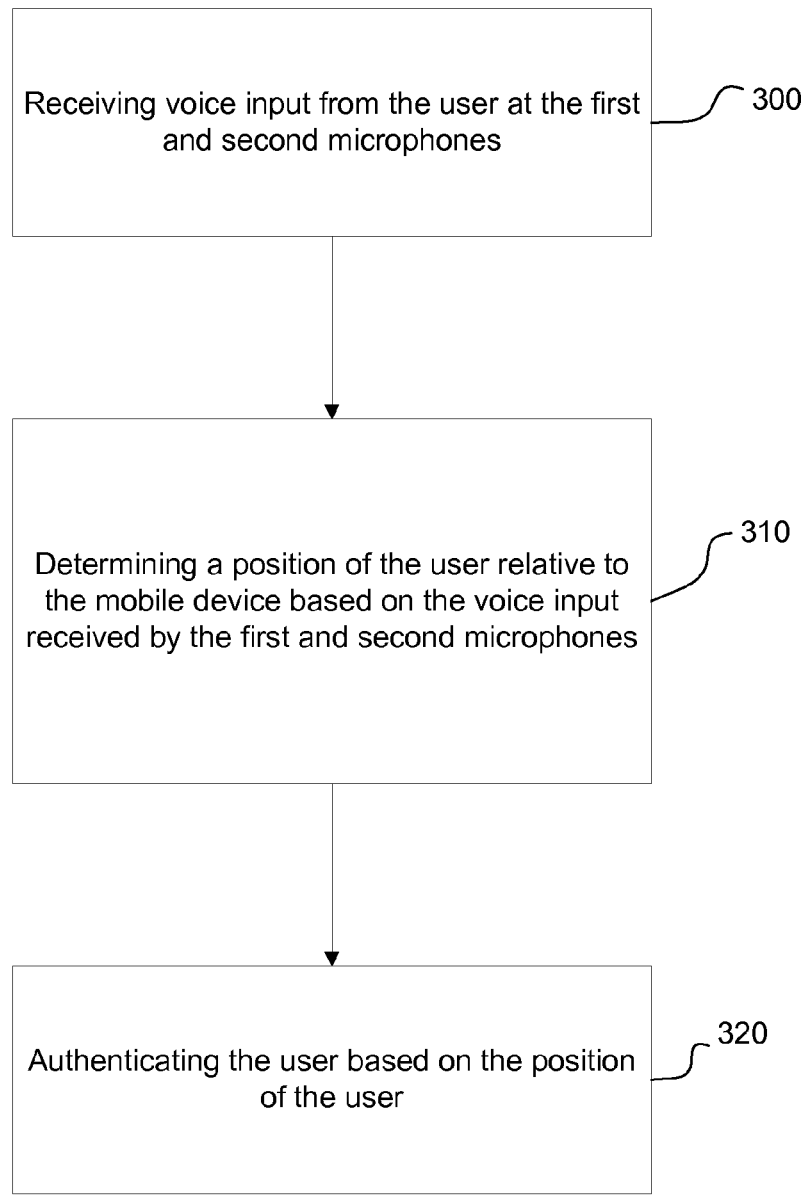
FIG. 8 is a flowchart depicting steps of a method of authenticating a user of a mobile device using stereo microphones to determine the position of the user relative to the mobile device.

The present technology furthermore enables new methods of authenticating a user. In general, as depicted by way of example in FIG. 8, a method of authenticating a user of a mobile device having a first microphone and a second microphone entails a step 300 of receiving voice input from the user at the first and second microphones, a step 310 of determining a position of the user relative to the mobile device based on the voice input received by the first and second microphones, and a step 320 of authenticating the user based on the position of the user.

In one implementation of the method, the step of determining the position comprises computing a time difference of arrival (TDOA) for the voice input received at the first and second microphones. This enables the angle or position of the speaker to be computed geometrically based on the speed of sound (rate of propagation of the voice from the user's mouth to the device) and based on the distance between the first and second microphones.

Figure 9:
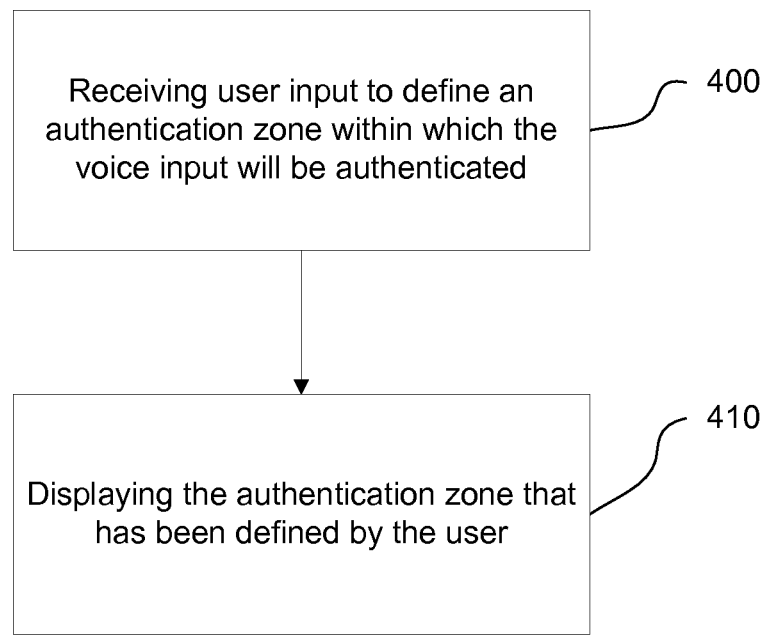
FIG. 9 is a flowchart depicting steps of a related method in which the device receives user input to define the authentication zone.

In one implementation, depicted in FIG. 9, the method further comprises a step 400 of receiving user input to define an authentication zone within which the voice input will be authenticated. The user input may be touch-screen input or any other form of user input (mouse input, keyboard input, trackpad input, voice command, etc) to specify the authentication zone. In one specific implementation, the area surrounding the device is divided into angular sectors. The user can then select one of the angular sectors as being the authentication zone. In a variant, the user may select multiple adjoining or even non-adjoining sectors to constitute the authentication zone or zones.

As further depicted in FIG. 9, the method further comprises a step 410 of displaying the authentication zone that has been defined by the user. Once the user has defined the authentication zone, the device displays the authentication zone. For example, this may be done by presenting an angular sector that represents the authentication zone with a predetermined or user-specified graphical indicator (color, shading, label, symbol, etc). In one example implementation, the authentication zone is displayed automatically and for a predetermined period of time on the screen of the device after the user has defined the authentication zone. The authentication zone may be presented, for example, for a predetermined time (e.g. 2 seconds, 5 seconds, 10 seconds, etc.) after the user defines the zone or until user input is received to cause the zone to disappear. The display of the authentication zone may be within a small window that appears and then disappears without occupying the full screen.

Figure 10:
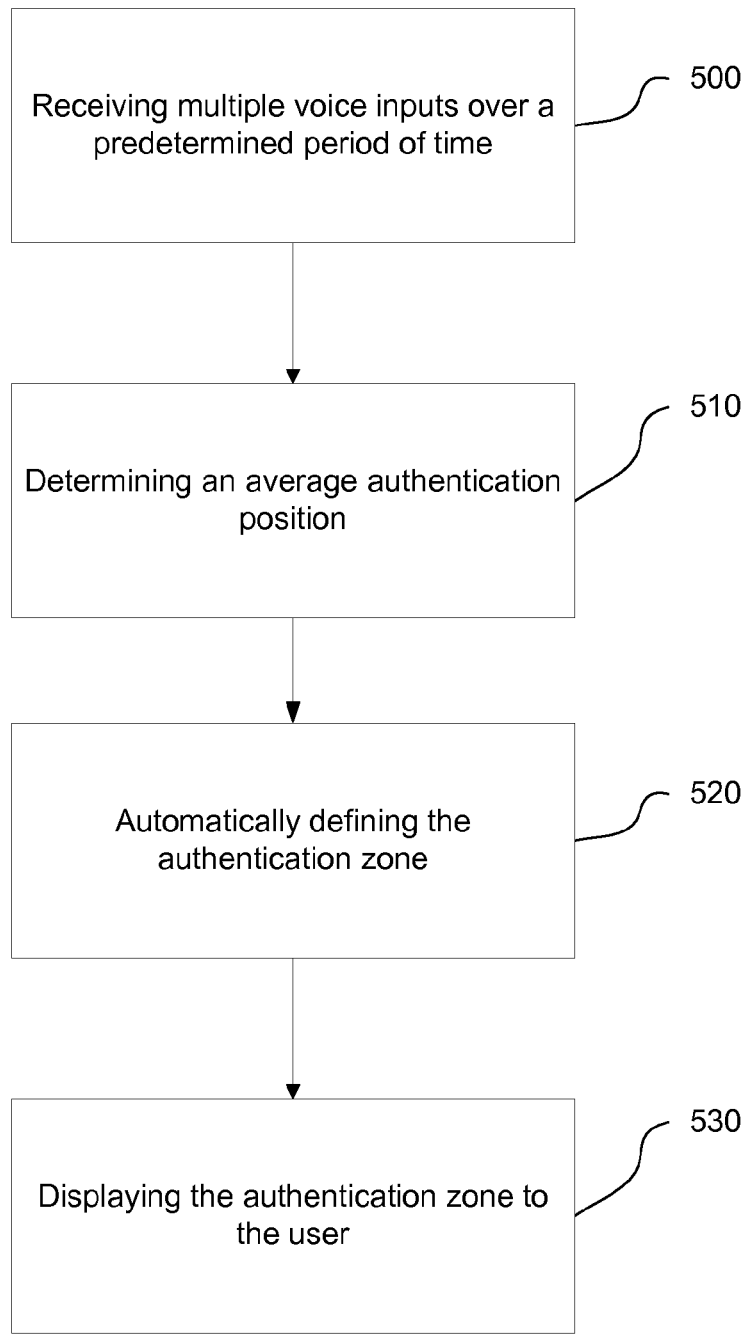
FIG. 10 is a flowchart depicting steps of a related method in which the authentication zone is automatically determined based on multiple voice inputs received over a period of time.

As depicted in FIG. 10, the method of automatically setting the authentication zone comprises a step 500 of receiving multiple voice inputs over a predetermined period of time, a step 510 of determining an average authentication position, a step 520 of automatically defining the authentication zone, and a step 530 of displaying the authentication zone to the user. Automatic determination of the authentication zone thus involves the user providing voice input to the device over a prescribed period of time. This may be done in a training mode whereby the user enters the training mode and then provides a series of voice input samples to the device. Alternatively, this may be done by collecting voice input during normal usage of the device (i.e. when the user provides everyday voice commands to the device). Alternatively, this may be done by collecting the voice input only when voice input is provided in the context of logging into the device. A sliding sample window may be used to use only the last N samples. In a variant, the device may be configured to use all samples ever collected or all samples since a certain event, e.g. since reboot, since turning on the device, since a certain date, etc. Regardless of the sample size and sampling period, the multiple voice input samples are collected and analyzed to determine the average position. The average position is used by the device to determine the authentication zone. This is displayed to the user to inform the user so that the user knows what authentication zone has been set.

Figure 11:
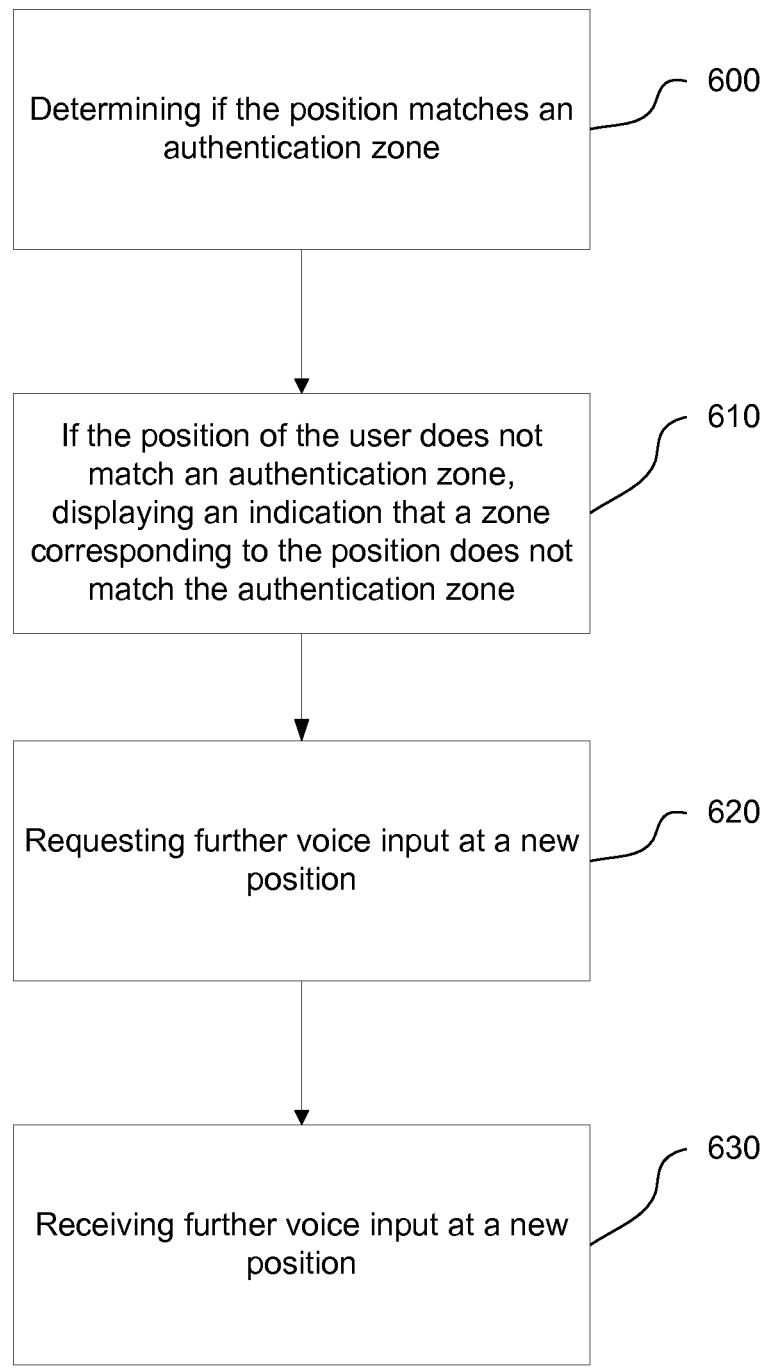
FIG. 11 is a flowchart depicting steps of a further method in which the device determines if the position corresponds to the authentication zone and, if not, requests further voice input at a new position.

FIG. 11 depicts a flowchart of a related method of notifying the user that authentication has failed and new input is required. This method comprises a step 600 of determining if the position of the user speaking the password or passphrase corresponds to the authentication zone. At step 610, the device, in response to determining that the position of the user does not match an authentication zone, displays an indication that a zone corresponding to the position of the user when the voice input was received does not match the authentication zone to thereby guide the user to provide further voice input in a new position relative to the mobile device. If the device fails to authenticate the user because the voice is not emanating from the correct position, then the device may indicate that the user should try again from a new position relative to the device. In other words, the device requests further voice input at step 620. This will require the user to displace the device (or the user moving relative to the device) and then speaking the password or passphrase again. In other words, at step 630, the device receives the further voice input 630 and once again determines if the user is within the authentication zone.

In a variant, the authentication system and method of authenticating the user may include multi-factor authentication, requiring voice input and another form of input, e.g. a password, token, fingerprint, retina scan, facial recognition, etc. The authentication of the user may be done based on the voice print of the voice input or it may also be based on a password or passphrase. In the former case, the device merely seeks to establish that the speaker's voice indeed matches the voice of the authorized user of the device. In the latter case, the device further ascertains that the password or passphrase is correct. In other words, in one specific implementation, the device first determines if the voice belongs to the authorized user. If so, the device then determines if the password or passphrase is correct. If so, the device then determines if the angle or position of the user's voice lies within the correct authentication zone. Further authentication requirements may be added, including for example digital fingerprint, facial recognition, etc.

Although the foregoing authentication technology is primarily intended in the context of login, this may be applied to selectively grant access to any restricted data, file, application, drive or memory partition. For example, the user may encrypt a file or a drive. Access may be granted by the device only if the user speaks the correct password from within the correct authentication zone.

Any of the methods disclosed herein may be implemented in hardware, software, firmware or any combination thereof. Where implemented as software, the method steps, acts or operations may be programmed or coded as computer-readable instructions and recorded electronically, magnetically or optically on a fixed or non-transitory computer-readable medium, computer-readable memory, machine-readable memory or computer program product. In other words, the computer-readable memory or computer-readable medium comprises instructions in code which when loaded into a memory and executed on a processor of a computing device cause the computing device to perform one or more of the foregoing method(s).

A computer-readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

This invention has been described in terms of specific embodiments, implementations and configurations which are intended to be exemplary only. Persons of ordinary skill in the art will appreciate, having read this disclosure, that many obvious variations, modifications and refinements may be made without departing from the inventive concept(s) presented herein. The scope of the exclusive right sought by the Applicant(s) is therefore intended to be limited solely by the appended claims.

The invention claimed is:

1. A method of authenticating a user of a mobile device having a first microphone and a second microphone, the method comprising:
   receiving voice input from the user at the first and second microphones;
   determining a position of the user relative to the mobile device based on the voice input received by the first and second microphones; and
   authenticating the user based on the position of the user.

2. The method as claimed in claim 1 wherein determining the position comprises computing a time-of-arrival difference for the voice input received at the first and second microphones.

3. The method as claimed in claim 1 further comprising receiving user input to define an authentication zone within which the voice input will be authenticated.

4. The method as claimed in claim 3 further comprising displaying the authentication zone that has been defined by the user.

5. The method as claimed in claim 3 further comprising:
   receiving multiple voice inputs over a predetermined period of time;
   determining an average authentication position;
   automatically defining the authentication zone; and
   displaying the authentication zone to the user.

6. The method as claimed in claim 1 further comprising, in response to the mobile device determining that the position of the user does not match an authentication zone, displaying an indication that a zone corresponding to the position of the user when the voice input was received does not match the authentication zone to thereby guide the user to provide further voice input in a new position relative to the mobile device.

7. A non-transitory computer-readable medium comprising instructions in code which when loaded into a memory and executed by a processor of a mobile device cause the mobile device to perform acts of:
   receiving voice input from the user at the first and second microphones;
   determining a position of the user relative to the mobile device based on the voice input received by the first and second microphones; and
   authenticating the user based on the position of the user.

8. The computer-readable medium as claimed in claim 7 wherein determining the position comprises computing a time-of-arrival difference for the voice input received at the first and second microphones.

9. The computer-readable medium as claimed in claim 7 further comprising receiving user input to define an authentication zone within which the voice input will be authenticated.

10. The computer-readable medium as claimed in claim 9 further comprising displaying the authentication zone that has been defined by the user.

11. The computer-readable medium as claimed in claim 9 further comprising code for further causing the device to perform acts of:
    receiving multiple voice inputs over a predetermined period of time;
    determining an average authentication position;
    automatically defining the authentication zone; and
    displaying the authentication zone to the user.

12. The computer-readable medium as claimed in claim 7 further comprising, in response to the mobile device determining that the position of the user does not match an authentication zone, displaying an indication that a zone corresponding to the position of the user when the voice input was received does not match the authentication zone to thereby guide the user to provide further voice input in a new position relative to the mobile device.

13. A mobile device comprising:
    first and second microphones for receiving voice input from a user of the mobile device; and
    a processor operatively coupled to a memory for determining a position of the user relative to the mobile device based on the voice input received at the first and second microphones and for authenticating the user based on the position of the user.

14. The mobile device as claimed in claim 13 wherein the processor is configured to compute a time-of-arrival difference for the voice input received at the first and second microphones.

15. The mobile device as claimed in claim 13 comprising a user input device for receiving user input to define an authentication zone within which the voice input will be authenticated.

16. The mobile device as claimed in claim 13 comprising a display for displaying the authentication zone that has been defined by the user.

17. The mobile device as claimed in claim 13 wherein the processor is configured to determine an average authentication position based on multiple voice inputs received over a predetermined period of time, to automatically define the authentication zone based on the average authentication position, and to display the authentication zone to the user.

18. The mobile device as claimed in claim 13 wherein the processor is configured to determine if the position matches an authentication zone and, in response to the processor determining that the position of the user does not match an authentication zone, causes a display of the mobile device to present an indication that a zone corresponding to the position of the user when the voice input was received does not match the authentication zone to thereby guide the user to provide further voice input in a new position relative to the mobile device.

* * * * *